J. W. SCHNEIDER.
FEEDER FOR THRESHING MACHINES AND THE LIKE.
APPLICATION FILED SEPT. 15, 1911.
1,012,922.
Patented Dec. 26, 1911.
2 SHEETS—SHEET 1.
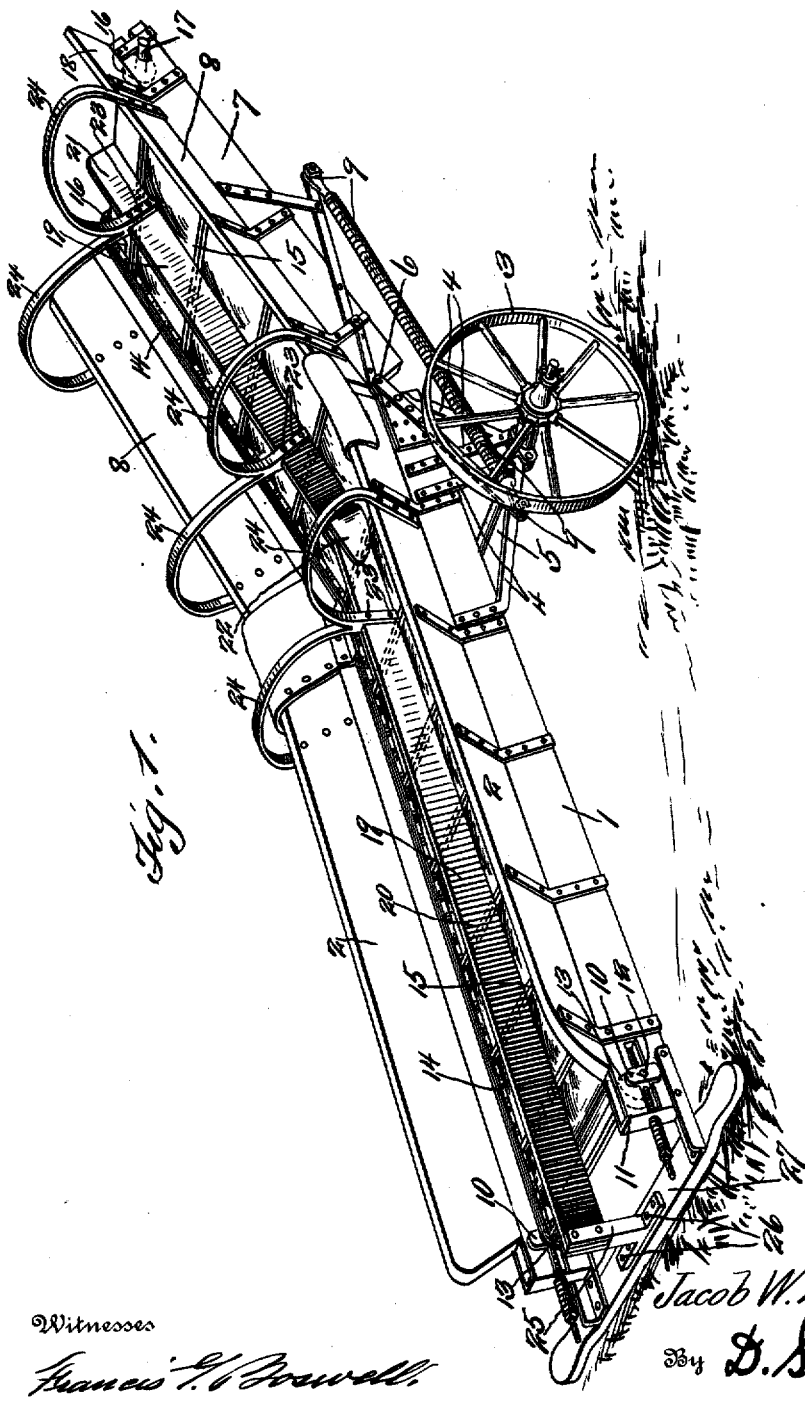
Witnesses
Francis T. Crowell
C. E. Frothingham
Inventor
Jacob W. Schneider,
By D. Swift & Co.
Attorneys J. W. SCHNEIDER.
FEEDER FOR THRESHING MACHINES AND THE LIKE.
APPLICATION FILED SEPT. 15, 1911.
1,012,922.
Patented Dec. 26, 1911.
2 SHEETS—SHEET 2.
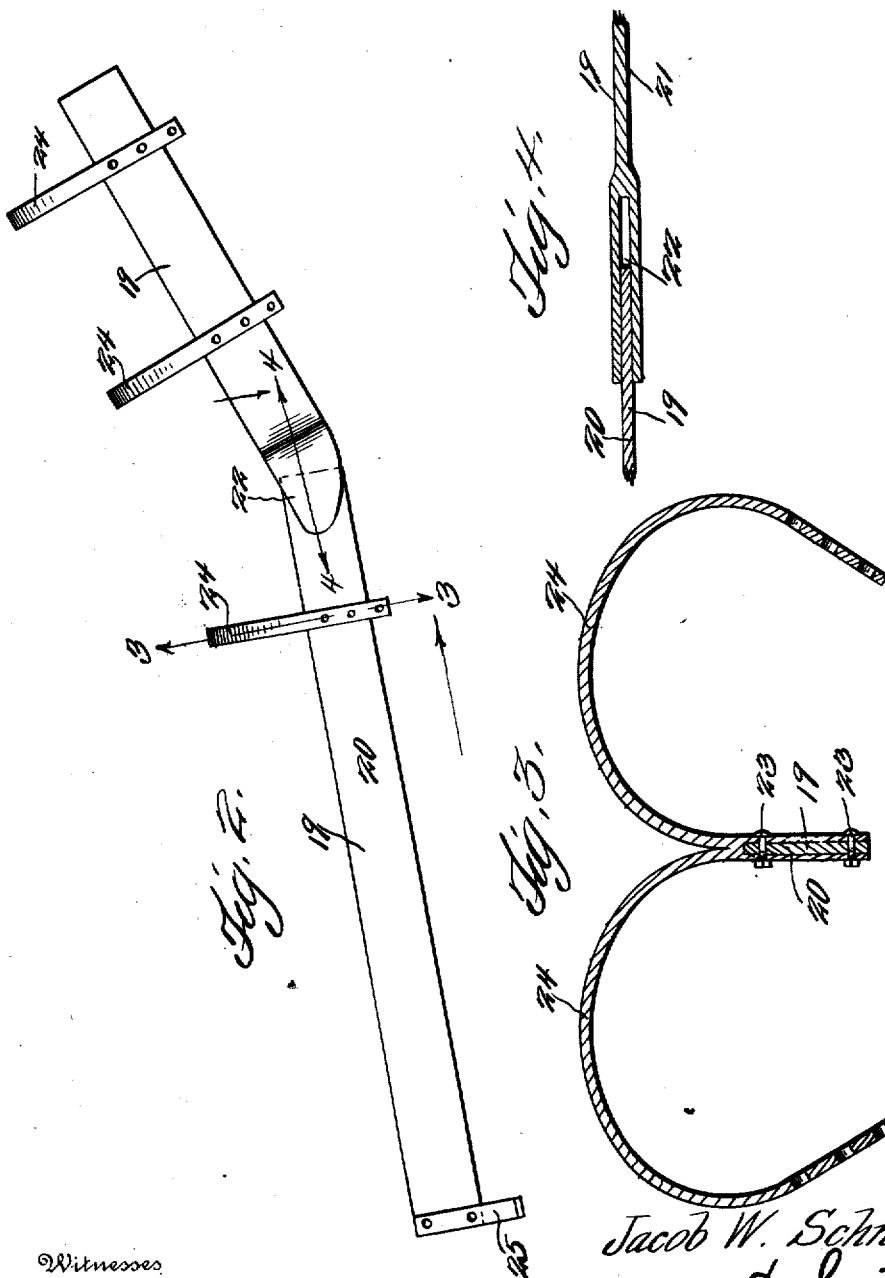

UNITED STATES PATENT OFFICE.

JACOB W. SCHNEIDER, OF ELLINWOOD, KANSAS.

FEEDER FOR THRESHING-MACHINES AND THE LIKE.

1,012,922.      Specification of Letters Patent.      Patented Dec. 26, 1911.

Application filed September 15, 1911. Serial No. 649,428.

*To all whom it may concern:*

Be it known that I, JACOB W. SCHNEIDER, a citizen of the United States, residing at Ellinwood, in the county of Barton and State of Kansas, have invented a new and useful Feeder for Threshing-Machines and the Like; and I do hereby declare the following to be a full, clear, and exact description of the invention, such as will enable others skilled in the art to which it appertains to make and use the same.

This invention relates to the art of feeders and loaders and the like, and particularly to a new and useful extension grain feeder and loader, adapted for use in connection with a threshing machine. The invention in its broadest scope aims to provide a device of this nature, which is a labor and time saving apparatus, by reason of the fact that, two wagons, one standing behind the other, may be unloaded simultaneously. In utilizing a feeder and loader of this nature, the grain may be thrown on the lower part of the feeder, that is, the part resting on the ground, so as to be fed to the threshing machine, without being blown away.

The basic feature of construction of the apparatus is the provision of a divide board or partition, arranged longitudinally of the feeder, for approximately its full length, whereby bundle grain may be fed to the threshing machine. This divide board or partition may be detached, when it is desired to feed headed grain.

A further feature of the invention (which is auxiliary to the basic feature of construction) is the provision of means for holding the divide board or partition in position securely.

The invention comprises further features and combination of parts, as hereinafter set forth, shown in the drawings and claimed.

In the drawings:—Figure 1 is a view in perspective of a feeder and loader, constructed in accordance with the invention. Fig. 2 is a detail view of the divide board detached from the feeder and loader. Fig. 3 is a sectional view on line 3—3 of Fig. 2. Fig. 4 is a sectional view on line 4—4 of Fig. 2.

Referring to the drawings 1 designates the main trough like member, of the feeder and loader. This trough like member, on each side is provided with the extension boards 2. The trough like member is supported on the wheels 3, by virtue of the frames 4 and the axle 5.

Hinged to the trough like member 1 as at 6, is an extension trough like member 7, having the extension boards 8, one on each side, as shown. Connecting between the extension trough like member 7 and the member 1 is a yieldable connection 9, the purpose of which is clearly apparent.

Journaled in adjustable bearings 10 at the end 11 of the member 1 is a shaft 12 having the usual sprockets 13 about which the chains 14 of the raddle or conveyer 15 travel. The chains 14 also travel about the sprockets 16, on the shaft 17, which is mounted in bearings of the extension trough like member 7. The end 18 of the extension trough like member is adapted to connect to the threshing machine (not shown), so as to feed the grain thereto.

Arranged centrally and longitudinally of the feeder approximately for its full length is what may be termed the "divide" board or partition 19, which consists of two sections 20 and 21. The section 20 is carried by the trough like member 1 while the section 21 is carried by the extension trough like member 7. The two sections 20 and 21 are provided with inter-engaging connections 22, so that when the extension trough like member 7 is raised or lowered, there will be no space or opening left between the adjacent ends of the sections of the board. Arching over the trough like members 1 and 7, and connecting to the divide board or partition, as at 23, are the arched bars 24, the outer ends of which are secured to the extension boards 2 and 8. The forward end of the divide board is held in place by the support 25, which is bolted or otherwise secured at 26 to the transverse beam 27 of the trough like member 1.

When utilizing the feeder and loader, for feeding bundle grain, the bundles are placed lengthwise with the feeder, on each side of the divide board, which will divide the bundles and hold them straight during their travel to the threshing machine. As the bundles reach the point where the feeder and loader connects with the threshing machine (not shown), one of the operators cuts the binding of the bundles, so as to allow the grain to enter the threshing machine properly. In feeding headed grain the divide board is removed.

From the foregoing it will be observed that there has been produced a simple, novel, and efficient extension grain feeder and loader, and one which has been found to be practicable.

The invention having been set forth, what is claimed as new and useful is:

An extension feeder and loader including a raddle, and a sectional divide board arranged substantially centrally and longitudinally for approximately the full length of the feeder, the sections of the divide board having an inter-engaging connection, and arched bars arching over the feeder and loader and connected to the divide board for securing the same in place, and means for supporting the forward end of the divide board.

In testimony whereof I have signed my name to this specification in the presence of two subscribing witnesses.

JACOB W. SCHNEIDER.

Witnesses:
 FRED WOLF,
 F. W. LUDWIG.

Copies of this patent may be obtained for five cents each, by addressing the "Commissioner of Patents, Washington, D. C."